(12) United States Patent
Watanabe

(10) Patent No.: US 11,873,025 B2
(45) Date of Patent: Jan. 16, 2024

(54) FRONT STRUCTURE OF VEHICLE

(71) Applicant: HONDA MOTOR CO., LTD., Tokyo (JP)

(72) Inventor: Yoshinobu Watanabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/676,846

(22) Filed: Feb. 22, 2022

(65) Prior Publication Data
US 2022/0266912 A1 Aug. 25, 2022

(30) Foreign Application Priority Data
Feb. 24, 2021 (CN) .................... 202110209278.X

(51) Int. Cl.
*B62D 21/15* (2006.01)
*B62D 5/04* (2006.01)
*B62D 25/04* (2006.01)
*B62D 3/12* (2006.01)
*B62D 25/14* (2006.01)

(52) U.S. Cl.
CPC ............ *B62D 21/155* (2013.01); *B62D 3/12* (2013.01); *B62D 5/0403* (2013.01); *B62D 25/14* (2013.01)

(58) Field of Classification Search
CPC ........ B62D 3/12; B62D 21/155; B62D 25/14; B62D 5/0403; B62D 21/11; B62D 21/152

USPC ..................................................... 280/93.515
See application file for complete search history.

(56) References Cited

U.S. PATENT DOCUMENTS

| | | | | |
|---|---|---|---|---|
| 9,199,662 | B2 * | 12/2015 | Ueno | B62D 3/12 |
| 9,586,612 | B2 * | 3/2017 | Hardesty | B62D 1/195 |
| 9,776,663 | B1 * | 10/2017 | Craig | B60K 5/12 |
| 2013/0200653 | A1 * | 8/2013 | Yasui | B62D 21/15 |
| | | | | 296/187.08 |
| 2017/0240205 | A1 * | 8/2017 | Nakada | B62D 15/025 |
| 2019/0322164 | A1 * | 10/2019 | Sasaki | B62D 21/155 |
| 2020/0298909 | A1 * | 9/2020 | Kogure | B62D 5/0421 |

FOREIGN PATENT DOCUMENTS

| | | | | |
|---|---|---|---|---|
| FR | 2789031 A1 * | 8/2000 | | B60R 19/00 |
| JP | 4885033 B2 * | 2/2012 | | |
| JP | 2013067317 A | 4/2013 | | |

* cited by examiner

*Primary Examiner* — Paul N Dickson
*Assistant Examiner* — Caitlin Anne Miller
(74) *Attorney, Agent, or Firm* — CKC & Partners Co., LLC

(57) ABSTRACT

A vehicle front structure is mounted on a vehicle, and includes a steering gearbox that includes a steering rack with rack teeth being formed thereon, and a pinion that meshes with the rack teeth. A shaft of the pinion protrudes rearward and downward of the vehicle. Thus, the vehicle front structure can reduce damage by the steering gearbox to the vehicle interior in case of a frontal collision of the vehicle.

12 Claims, 5 Drawing Sheets

US 11,873,025 B2

FRONT STRUCTURE OF VEHICLE

This application is based on and claims the benefit of priority from Chinese Patent Application No. 202110209273.X, filed on 24 Feb. 2021, the content of which is incorporated herein by reference.

BACKGROUND OF THE INVENTION

Field of the Invention

The present invention relates to a vehicle front structure.

Related Art

Conventionally, a vehicle front structure that allows a steering gearbox that includes a steering rack with rack teeth being formed thereon, and a pinion meshing with the rack teeth to be mounted on a vehicle has been known (for example, see Patent Document 1).

Patent Document 1: Japanese Unexamined Patent Application, Publication No. 2013-67317

SUMMARY OF THE INVENTION

The pinion, which meshes with the rack teeth of the steering gearbox, includes a shaft that extends in a direction orthogonal to the central axis of the steering gearbox. The shaft of the pinion protrudes from the steering gearbox rearward and obliquely upward of a vehicle so as to be oriented toward a vehicle interior, in order to be mechanically coupled with a steering column extending from a steering in the vehicle interior. Accordingly, there is a problem in that in case an engine compartment is deformed by a frontal collision of the vehicle, the shaft of the pinion may penetrate through a dashboard lower panel arranged rearward of the steering gearbox and damage the vehicle interior.

The present invention has an object to provide a vehicle front structure that can reduce damage by the steering gearbox to the vehicle interior in case of a frontal collision of the vehicle.

(1) A vehicle front structure mounted on a vehicle, the vehicle front structure comprising a steering gearbox (e.g., a steering gearbox 3 described later) that includes a steering rack with rack teeth being formed thereon, and a pinion that meshes with the rack teeth, the pinion including a shaft (e.g. a shaft 35 described later) that protrudes rearward and downward of the vehicle.

(2) In the vehicle front structure according to (1) described above, the vehicle may include, a front subframe (e.g., a front subframe 1, 4 described later), and the steering gearbox may be mounted on the front subframe.

(3) In the vehicle front structure according to (2) described above, the front subframe may include a fragile part (e.g., a fragile part 43 described later) that causes a downward bending deformation in case of a frontal collision of the vehicle.

(4) In the vehicle front structure according to any of (1) to (3) described above, the vehicle may include a dashboard lower panel (e.g., a dashboard lower panel 2 described later) disposed rearward of the steering gearbox, the dashboard lower panel may include an inclined surface (e.g., an inclined surface 21 described later) at a bottom part thereof that faces the pinion, the inclined surface being inclined rearward toward downward of the vehicle, and a protruding direction of the shaft of the pinion may foe arranged along the inclined surface of the dashboard lower panel.

(5) In the vehicle front structure according to any of (1) to (3) described above, the steering gearbox may be connected to a steering (e.g., a steering 201 described later) through a steering-by-wire system.

(6) In the vehicle front structure according to (4) described above, the steering gearbox may be connected to a steering (e.g., a steering 201 described later) through a steering-by-wire system.

According to (1) described above, the shaft of the pinion protruding from the steering gearbox protrudes rearward and downward of the vehicle. Consequently, in case of a frontal collision of the vehicle, the shaft of the pinion guides the steering gearbox below the vehicle, which can prevent the steering gearbox from entering the vehicle interior. This can reduce damage by the steering gearbox to the vehicle interior in case of a frontal collision of the vehicle.

According to (2) described above, the steering gearbox can be mounted on the vehicle together with the engine and the like. Accordingly, the efficiency of the operation of installing the steering gearbox can be improved.

According to (3) described above, in case of a frontal collision of the vehicle, the front subframe is bent downward and deformed at the fragile part, which can efficiently move the steering gearbox below the vehicle.

According to (4) described above, in case of a frontal collision of the vehicle, the shaft of the pinion comes into contact with the inclined surface of the dashboard lower panel, thereby allowing the steering gearbox to be effectively guided below the vehicle. Consequently, the steering gearbox can be more effectively prevented from entering the vehicle interior.

According to (5) or (6) described above, the shaft of the pinion can utilize a steering gearbox mechanically coupled to a steering column, which can facilitate cost reduction.

DETAILED DESCRIPTION OF THE INVENTION

Figure 1:
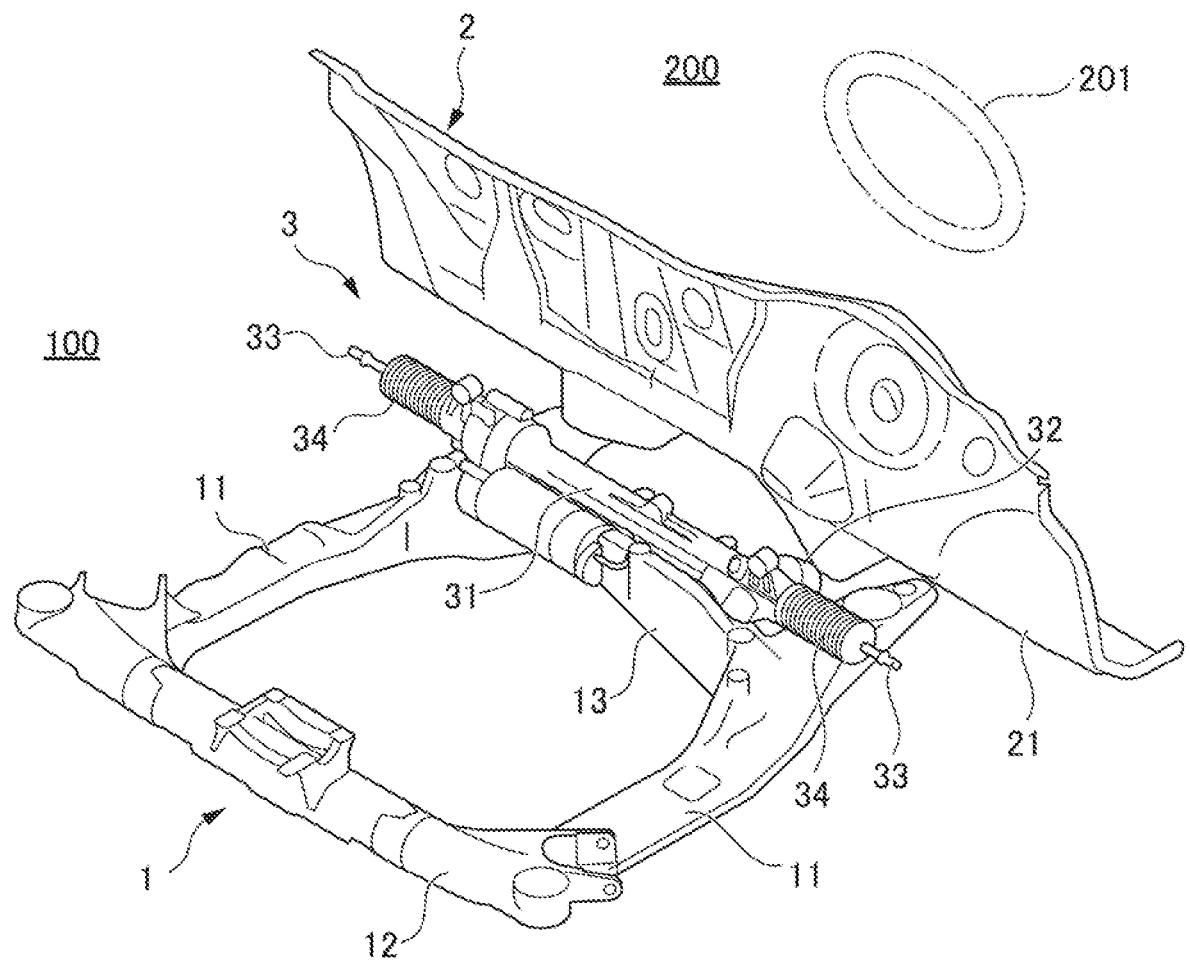
FIG. 1 is a perspective view showing a vehicle front structure that includes a steering gearbox.
Figure 2:
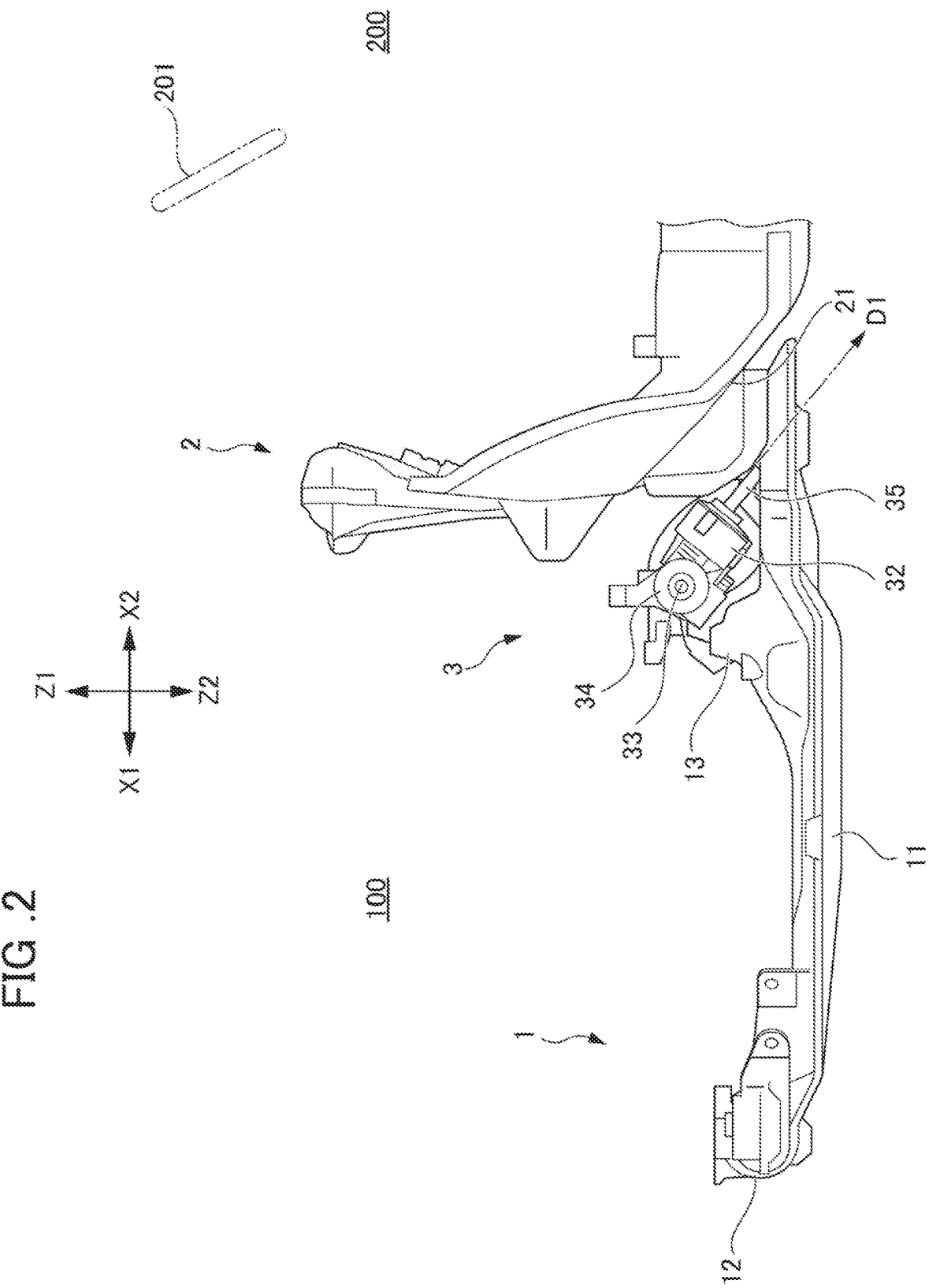
FIG. 2 is a side view showing the vehicle front structure that includes the steering gearbox.

Hereinafter, embodiments of the present invention are described in detail with reference to the drawings. FIG. 1 is a perspective view showing a vehicle front structure that includes a steering gearbox. FIG. 2 is a side view showing the vehicle front structure that includes the steering gearbox. Here, directions indicated by arrows in each of the drawings are described. An X1-X2 direction indicates a forward and rearward direction of a vehicle. An X1 direction indicates the forward direction of the vehicle. An X2 direction indicates the rearward direction of the vehicle. A Y1-Y2 direction indicates the width direction of the vehicle. A Y1 direction indicates the right viewed from a passenger facing the traveling direction of the vehicle. A Y2 direction indicates the left viewed from a passenger facing the traveling direction of the vehicle. A Z1-Z2 direction indicates the vertical direction of the vehicle. The Z1 direction indicates the upper direction of the vehicle. The Z2 direction indicates the downward direction of the vehicle.

At a front part of the vehicle, a front subframe 1 is arranged. The front subframe 1 is arranged in an engine compartment 100 of the vehicle, and supports a drive source, such as an engine and a motor, via a mounting mechanism not shown. The front subframe 1 in this embodiment includes: a left and right pair of longitudinal members 11 and 11 extending in the forward and rearward direction of the vehicle; a first cross member 12 that couples the front ends of the longitudinal members 11 and 11 with each other along the width direction of the vehicle; and a second cross member 13 that couples the portions near rear ends of the longitudinal members 11 and 11 with each other along the width direction of the vehicle. Rearward of the second cross member 13 there are arranged an engine compartment forward of the vehicle, and a dashboard lower panel 2 that partitions a vehicle interior 200 rearward of the vehicle from the engine compartment.

A steering gearbox 3 is mounted on the front subframe 1. The steering gearbox 3 is arranged on the second cross member 13 of the front subframe 1 so as to extend in the width direction of the vehicle along the second cross member 13. The steering gearbox 3 is thus mounted on the front subframe 1, thereby allowing the steering gearbox 3 to be mounted on the vehicle together with the engine and the like. Accordingly, the efficiency of the operation of installing the steering gearbox 3 can be improved.

The steering gearbox 3 accommodates a steering rack, not shown, with rack teeth being formed thereon, in a rack housing 31. A pinion holder 32 is provided on an external surface of the rack housing 31. The pinion holder 32 accommodates a pinion, not shown, which meshes with the rack teeth of the steering rack. Tie rod ends 33 and 33 coupled to front wheels, not shown, are connected to the rack ends, not shown, respectively arranged at the left and right ends of the steering rack. Connection parts between the rack end and the tie rod ends 33 and 33 are covered with dust seals 34 and 34.

The pinion accommodated in the pinion holder 32 rotates in a manner interlocked with the rotation of a steering 201 provided in the vehicle interior 200 to thereby move a steering rack, which meshes via the rack teeth, in the width direction of the vehicle, and operates the front wheels to the left and right. The pinion includes a shaft 35 serving as a rotation shaft. Here, this embodiment indicates a steering-by-wire system that electrically connect the steering 201 and the shaft 35 of the pinion to each other. Thus, the steering 201 and the shaft 35 of the pinion are not mechanically connected by the steering column.

The shaft 35 of the pinion by the steering-by-wire system is exposed in a state of protruding from the pinion holder 32 in a direction orthogonal to the central axis of the steering gearbox 3. As shown in FIG. 2, the shaft 35 protrudes from the pinion holder 32 in a D1 direction rearward and downward of the vehicle. That is, the shaft 35 extends obliquely downward from the pinion holder 32 toward the vehicle interior 200 side.

Accordingly, the steering gearbox 3 is moved rearward by deformation of the engine compartment 100 in case of a frontal collision of the vehicle, and the shaft 35 of the pinion collides with the dashboard lower panel 2 from the distal end of the shaft 35 of the pinion; at the collision, the shaft 35 slides below the dashboard lower panel 2 along the protruding direction of the shaft 35 itself, thus allowing the steering gearbox 3 to be guided below the vehicle. Accordingly, in case of a frontal collision of the vehicle, the steering gearbox 3 is prevented from entering the vehicle interior 200, thereby allowing damage applied to the vehicle interior 200 to decrease.

As shown in FIG. 2, the dashboard lower panel 2 may include an inclined surface 21 at a bottom part thereof facing the pinion of the steering gearbox 3, that is, the bottom part facing the pinion holder 32. The inclined surface 21 is formed so as to be inclined rearward toward downward of the vehicle. The protruding direction of the shaft 35 of the pinion is arranged along the inclined surface 21. For more detail, the shaft 35 protrudes rearward and downward from the pinion holder 32 along the inclination of the inclined surface 21 in substantially parallel therewith.

When the shaft 35 of the pinion comes into contact in case of a frontal collision of the vehicle, the inclined surface 21 of the dashboard lower panel 2 can guide the shaft 35 downward along the inclined surface 21. Accordingly, the steering gearbox 3 is effectively guided by both the shaft 35 and the inclined surface 21 of the dashboard lower panel 2 below the vehicle. Consequently, the steering gearbox 3 can be more effectively prevented from entering the vehicle interior 200.

Figure 3:
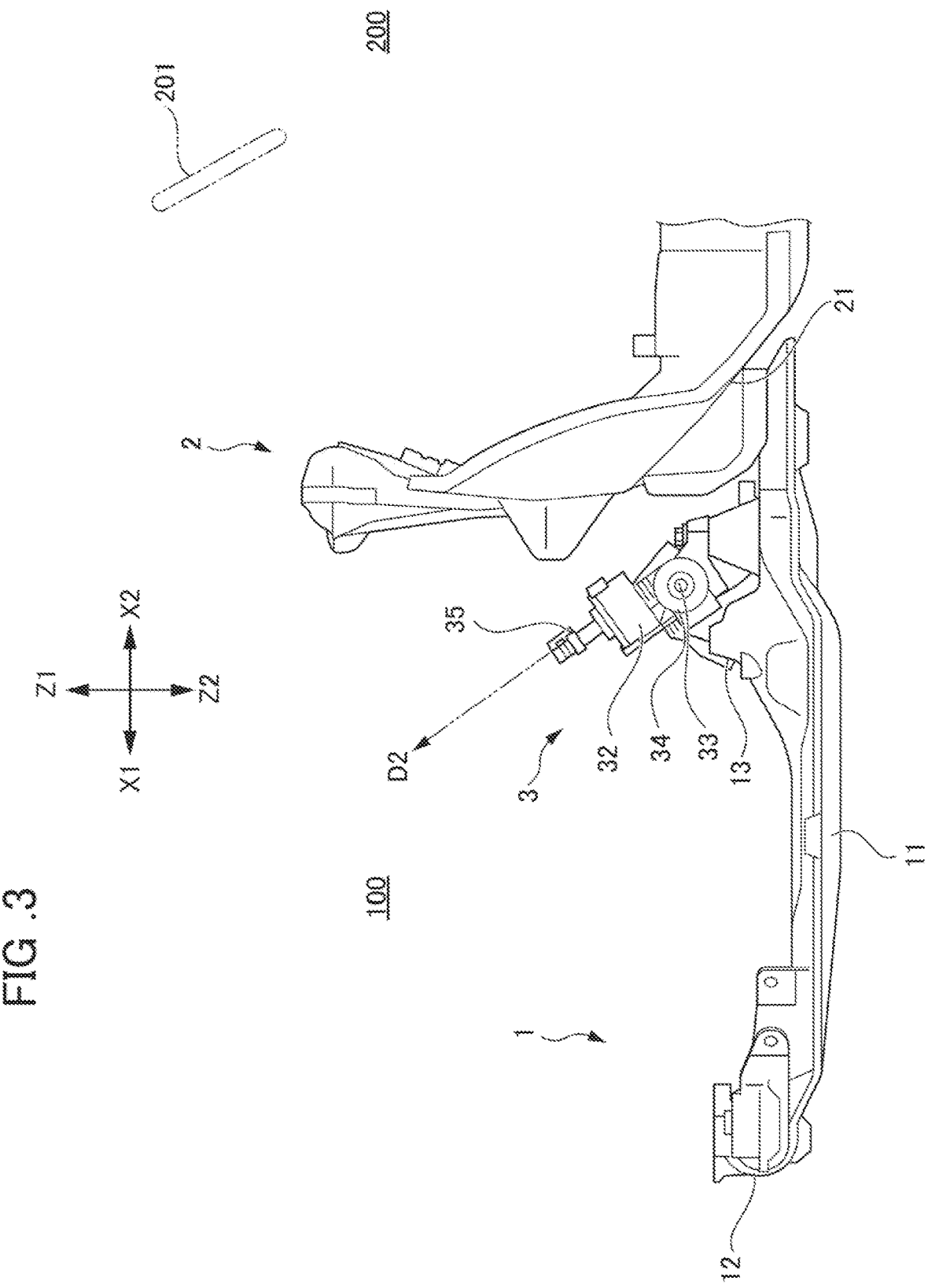
FIG. 3 is a side view showing another embodiment of the vehicle front structure that includes the steering gearbox.

In the embodiment, described above, the shaft 35 of the pinion of the steering gearbox 3 protrudes in the D1 direction rearward and downward of the vehicle. However, to prevent the shaft 35 from entering the vehicle interior 200 in case of a frontal collision of the vehicle, the shaft 35 may protrude forward of the vehicle, as shown in FIG. 3. FIG. 3 is a side view showing another embodiment of the vehicle front structure that includes the steering gearbox 3. The shaft 35 shown in FIG. 3 protrudes in a D2 direction forward and obliquely upward of the vehicle. However, the shaft 35 may protrude forward of the vehicle in the horizontal direction, or protrude forward and obliquely downward. In a case where the shaft 35 protrudes forward of the vehicle, the steering gearbox 3 is not guided by the shaft 35 below the vehicle in case of a frontal collision of the vehicle. The steering gearbox 3 can be guided downward of the vehicle along the inclined surface 21 provided at the bottom part of the dashboard lower panel 2.

Figure 4:
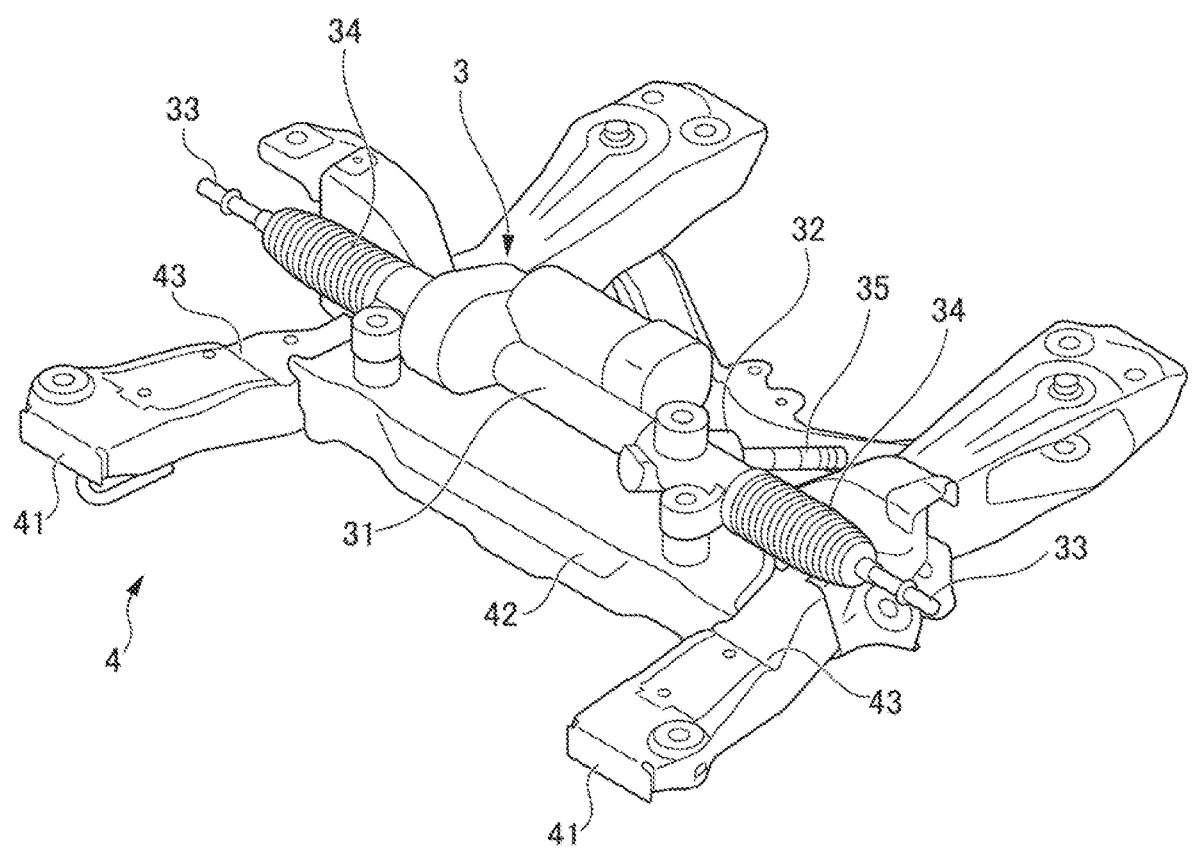
FIG. 4 is a perspective view showing a front subframe that includes a fragile part.
Figure 5:
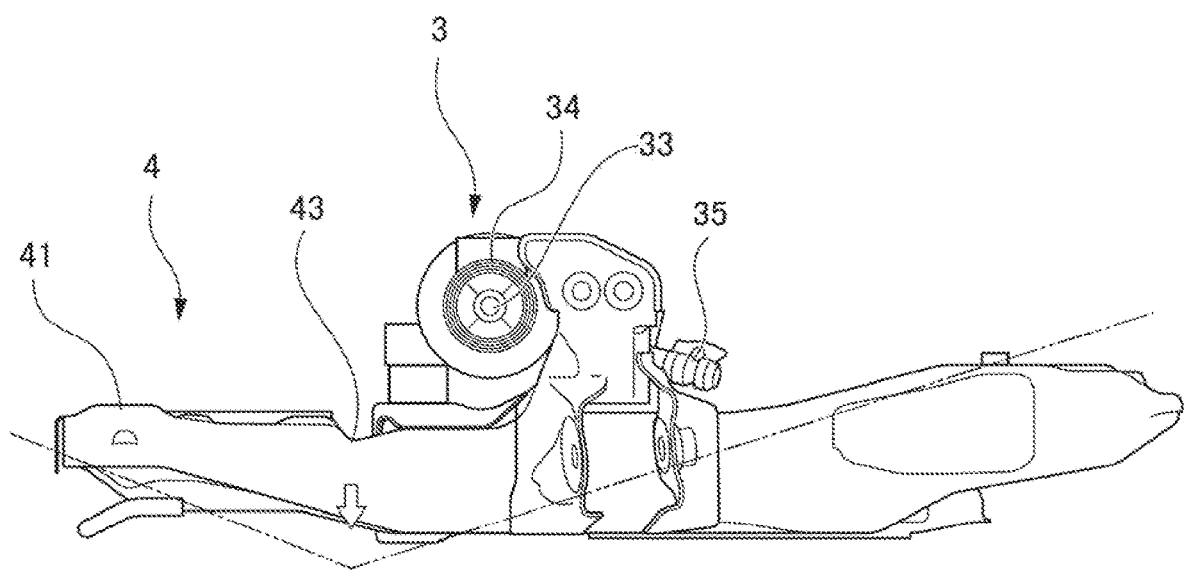
FIG. 5 is a side view showing the front subframe that includes the fragile part.

FIGS. 4 and 5 show another embodiment of the front subframe on which the steering gearbox 3 is mounted. The front subframe 4 includes: a left and right pair of longitudinal members 43 and 41 extending along the forward and rearward direction of the vehicle; and a cross member 42 that couples the intermediate parts of the longitudinal members 41 and 41 along the width direction of the vehicle. The steering gearbox 3 is arranged on the cross member 42 so as to extend in the width direction of the vehicle along the cross member 42. The shaft 35 of the pinion of the steering gearbox 3 protrudes rearward and downward of the vehicle.

The longitudinal members 41 and 41 of the front subframe 4 are respectively provided with fragile parts 43 and 43 that cause downward bending deformations in case of a frontal collision of the vehicle. The fragile parts 43 and 43 are respectively formed of concaves having a predetermined depth. The fragile parts 43 and 43 are arranged slightly forward of the cross member 42 and the steering gearbox 3 on the upper surfaces of the longitudinal members 41 and 41, and extend in the width direction of the front subframe 4 orthogonal to the forward and rearward direction of the vehicle.

The longitudinal members 41 and 41 are thus provided with the fragile parts 43 and 43, thereby making the strength of the front subframe 4 locally weak at the fragile parts 43 and 43. Accordingly, when a heavy load is applied from the front to the front subframe 4 in case of a frontal collision of the vehicle, the longitudinal members 41 and 41 are bent downward and deformed at the fragile parts 43 and 43 serving as origination points to have a wide V-shape, as indicated by virtual lines and an arrow in FIG. 5. Thus, the steering gearbox 3 arranged rearward of the fragile parts 43 and 43 moves rearward while sinking downward with bending deformation of the longitudinal members 41 and 41. Consequently, in case of a frontal collision of the vehicle, the steering gearbox 3 can efficiently move downward of the vehicle.

Note that in FIGS. 4 and 5, the dashboard lower panel is omitted from illustration. However, similar to the embodiment shown in FIGS. 1 to 3, a dashboard lower panel is also provided rearward of the front subframe 4. Similar to the dashboard lower panel 2, an inclined surface 21 may be provided at the bottom part of the dashboard lower panel. Fragile parts similar to the fragile parts 43 may be provided for the longitudinal members 11 and 11 of the front subframe 1 shown in FIGS. 1 to 3.

The vehicle front structure shown in each embodiment described above indicates a steering-by-wire system that electrically connect the steering 201 and the shaft 35 of the pinion to each other. However, although not shown, the steering 201 and the shaft 35 of the pinion may be mechanically connected to the steering column via a link mechanism, for example.

The vehicle front structures according to the embodiments described above exert the following advantageous effects. That is, the vehicle front structure in each of the embodiments is mounted on a vehicle, and includes a steering gearbox 3 that includes a steering rack with rack teeth being formed thereon, and a pinion that meshes with the rack teeth. The shaft 35 of the pinion protrudes rearward and downward of the vehicle. Accordingly, in case of a frontal collision of the vehicle, shaft 35 of the pinion guides the steering gearbox 3 below the vehicle, thereby allowing the steering gearbox 3 to be prevented from entering the vehicle interior 200. This can reduce damage by the steering gearbox 3 to the vehicle interior 200 in case of a frontal collision of the vehicle.

The vehicle is provided with the front subframe 1. The steering gearbox 3 is mounted on the front subframe 1. Accordingly, the steering gearbox 3 can be mounted on the vehicle together with the engine and the like. Accordingly, the efficiency of the operation of installing the steering gearbox 3 can be improved.

The front subframe 4 shown in FIGS. 4 and 5 includes the fragile parts 43 that cause a downward bending deformation in case of a frontal collision of the vehicle. Accordingly, in case of a frontal collision of the vehicle, the front subframe 4 is bent downward and deformed at the fragile parts 43, which can efficiently move the steering gearbox 3 below the vehicle.

The vehicle includes the dashboard lower panel 2 disposed rearward of the steering gearbox 3. The dashboard lower panel 2 includes the inclined surface 21 at the bottom part of this panel that faces the pinion, the inclined surface 21 being inclined rearward toward downward of the vehicle. The protruding direction of the shaft 35 of the pinion is arranged along the inclined surface 21. Accordingly, in case of a frontal collision of the vehicle, the shaft 35 of the pinion comes into contact with the inclined surface 21 of the dashboard lower panel 2, thereby allowing the steering gearbox 3 to be effectively guided below the vehicle. Consequently, the steering gearbox 3 can be more effectively prevented from entering the vehicle interior 200.

The steering gearbox 3 is connected to the steering 201 through the steering-by-wire system. The shaft 35 of the pinion can utilize the steering gearbox 3 mechanically coupled to the steering column, which can facilitate cost reduction. Furthermore, the shaft 35 of the pinion includes no mechanical coupling part. Accordingly, arrangement can be easily achieved so that the front end of the shaft 35 can protrude rearward and downward of the vehicle from the steering gearbox 3.

What is claimed is:

1. A vehicle front structure mounted on a vehicle that includes an engine compartment arranged in a front cart of the vehicle, and a vehicle interior disposed rearward of the engine compartment, the vehicle front structure comprising a steering gearbox that includes a steering rack with rack teeth being formed thereon, and a pinion that meshes with the rack teeth,
   the pinion including a shaft that extends obliquely downward toward the vehicle interior.

2. The vehicle front structure according to claim 1, wherein the vehicle includes a front subframe, and the steering gearbox is mounted on the front subframe.

3. The vehicle front structure according to claim 2, wherein the front subframe includes a fragile part that causes a downward bending deformation in case of a frontal collision of the vehicle.

4. The vehicle front structure according to claim 1, wherein the vehicle includes a dashboard lower panel disposed rearward of the steering gearbox,
   the dashboard lower panel includes an inclined surface at a bottom part thereof that faces the pinion, the inclined surface being inclined rearward toward downward of the vehicle, and
   a protruding direction of the shaft of the pinion is arranged along the inclined surface.

5. The vehicle front structure according to claim 1, wherein the steering gearbox is connected to a steering wheel through a steering-by-wire system.

6. The vehicle front structure according to claim 4, wherein the steering gearbox is connected to a steering wheel through a steering-by-wire system.

7. A vehicle front structure mounted on a vehicle that includes an engine compartment arranged in a front part of the vehicle, and a vehicle interior disposed rearward of the engine compartment, the vehicle front structure comprising a steering gearbox that includes a steering rack with rack teeth being formed thereon, and a pinion that meshes with the rack teeth,
   the pinion including a shaft that protrudes forward of the vehicle in an obliquely upward direction.

8. The vehicle front structure according to claim 7, wherein the vehicle includes a front subframe, and the steering gearbox is mounted on the front subframe.

9. The vehicle front structure according to claim 8, wherein the front subframe includes a fragile part that causes a downward bending deformation in case of a frontal collision of the vehicle.

10. The vehicle front structure according to claim 7, wherein the vehicle includes a dashboard lower panel disposed rearward of the steering gearbox,
    the dashboard lower panel includes an inclined surface at a bottom part thereof that faces the pinion, the inclined surface being inclined rearward toward downward of the vehicle, and a protruding direction of the shaft of the pinion is arranged along the inclined surface.

11. The vehicle front structure according to claim 7, wherein the steering gearbox is connected to a steering wheel through a steering-by-wire system.

12. The vehicle front structure according to claim 10, wherein the steering gearbox is connected to a steering wheel through a steering-by-wire system.

* * * * *